Aug. 8, 1939.     E. R. SMITH     2,168,633
CONTOUR TURNING ATTACHMENT
Filed May 19, 1938
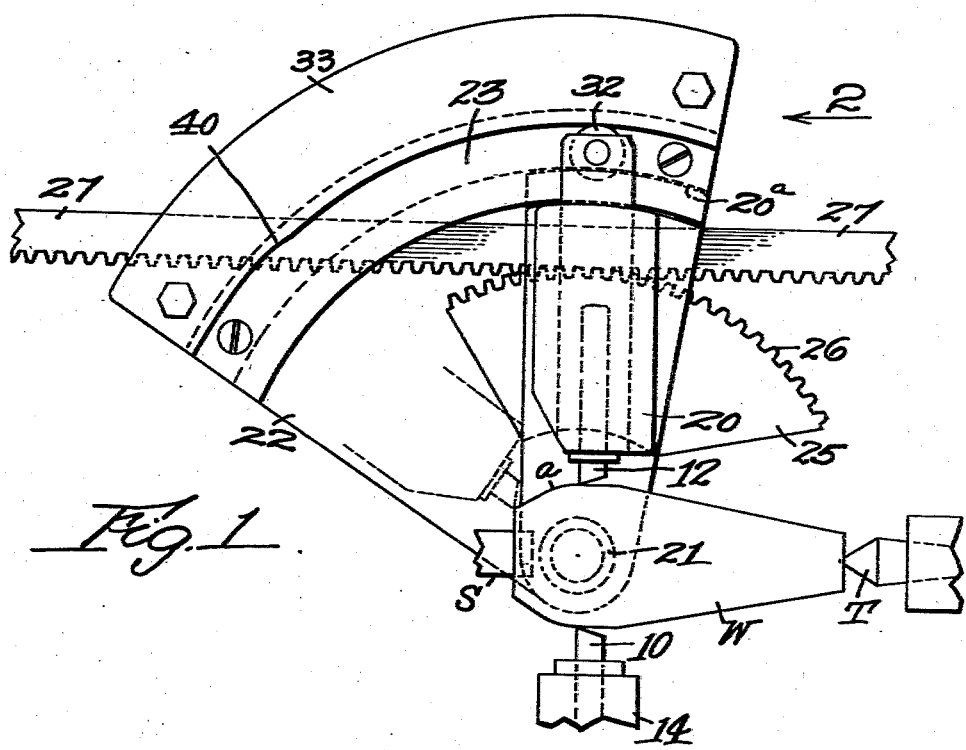
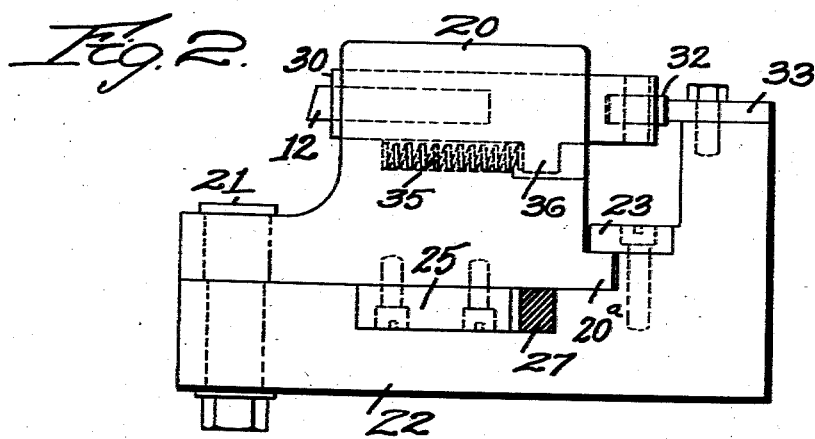
Inventor
Edwin R. Smith.

Patented Aug. 8, 1939

2,168,633

UNITED STATES PATENT OFFICE 2,168,633

CONTOUR TURNING ATTACHMENT

Edwin R. Smith, Seneca Falls, N. Y., assignor to Seneca Falls Machine Company, Seneca Falls, N. Y., a corporation of Massachusetts Application May 19, 1938, Serial No. 208,865

4 Claims. (Cl. 82—12)

This invention relates to lathes or other machines used in the production of work having a non-cylindrical or irregular contour. An example of such work might be a bomb having a tapered body portion and a rounded but non-spherical head portion.

In the machining of such irregularly contoured objects under modern operating conditions, it is essential that the tool be constantly presented to the contoured surface at the most desirable cutting angle, and that normal tool clearance be maintained without excessive backing-off and weakening of the tool.

It is the general object of my invention to provide an improved contour turning attachment by which a desired irregular form may be accurately produced, while at the same time the tool is advantageously positioned for most effective operation.

My invention further relates to arrangements and combinations of parts which will be hereinafter described and more particularly pointed out in the appended claims.

A preferred form of the invention is shown in the drawing, in which

Fig. 1 is a plan view of my improved turning attachment; and

Fig. 2 is a side elevation, looking in the direction of the arrow 2 in Fig. 1.

Referring to the drawing, I have shown a piece of work W supported at one end on a driving spindle S and at the other end on a tail center T. The work W is indicated as being in the form of a bomb, with the body thereof tapered toward the rear end and rounded but non-spherical at the other end.

I have also shown two cutting tools 10 and 12 for machining the work W. The front cutting tool 10 is mounted in the usual front tool holder, indicated generally at 14, and may be guided by the usual taper or contour bar to produce the tapered rear end and short cylindrical middle portion of the work. No novelty is claimed for the construction or operation of the front tool 10.

The rear cutting tool 12 is provided for turning the rounded front end portion $a$ of the work W. The turning attachment in which the tool 12 is mounted comprises a supporting member 20 pivoted on a stud 21 mounted in a base 22 adapted to be secured in fixed position on the bed of the lathe, with the axis of the stud 21 intersecting the longitudinal axis of the work, as clearly shown in Fig. 2.

The member 20 has a segmental flange 20ª projecting under a gib 23 by which vertical lost motion of the member 20 is prevented.

A gear segment 25 is secured to the lower face of the member 20 and is provided with segment gear teeth 26 engaged by a rack bar 27 mounted in guideways to slide longitudinally of the machine and actuated by driving connections not shown.

A tool holder 30 is mounted to slide in guideways in the member 20 and is provided at its rear end with a roll 32 positioned to engage a templet 33 mounted on an upwardly projecting portion of the fixed base 22.

The holder 30 and roll 32 are yieldingly held against the templet 33 in any convenient manner, as by a spring 35 mounted in a recess in the member 20 below the holder 30 and engaging a depending projection 36 of said holder.

The edge 40 of the templet 33 which is engaged by the roll 32 is shaped as may be desired to produce the desired contour. Obviously, if the edge 40 is concentric with the axis of the stud 21, the end of the work W will receive a segmental spherical outline, but if the edge 40 is not concentric, the shape of the work will be correspondingly modified.

While I have shown the stand or supporting member 20 pivoted on the stud 21, it will be understood that equivalent constructions may be substituted, so long as the stand is constrained to swing about a fixed pivot, and the claims are to be so interpreted.

My improved contour turning attachment has proved particularly effective in use, as the swinging movement of the tool maintains it at all times substantially normal to the surface being turned, and reasonable variations of the contour from spherical form do not change the cutting angle to such an extent as to materially affect the cutting action of the tool.

By using my improved turning attachment in combination with a front cutting tool for producing a regularly tapered portion in a piece of work, the two tools may be operated simultaneously and the time of the turning operation may be greatly reduced.

Having thus described my invention and the advantages thereof, I do not wish to be limited to the details herein disclosed, otherwise than as set forth in the claims, but what I claim is—

1. In a machine tool, a contour turning attachment comprising a tool holder, a stand mounted on a fixed pivot and in which said holder is slidably mounted, automatic means to swing said stand about its pivot while the tool is cutting, and pattern means to slide said tool holder radially in said stand as said stand swings on its fixed pivot.

2. In a machine tool, a contour turning attachment comprising a tool holder, a stand mounted on a fixed pivot and in which said holder is slidably mounted, automatic means to swing said stand about its pivot while the tool is cutting, and pattern means to slide said tool holder radially in said stand in predetermined relation to the angular movement of said stand as said stand swings on its fixed pivot.

3. In a machine tool, a contour turning attachment comprising a tool holder, a stand mounted on a fixed pivot and in which said holder is slidably mounted, automatic means to swing said stand about its pivot while the tool is cutting, and a templet effective to vary and control the radial position of said tool holder and tool during said swinging movement as said stand swings on its fixed pivot about said fixed pivot.

4. In a machine tool, a contour turning attachment comprising a tool holder, a stand mounted on a fixed pivot and in which said holder is slidably mounted, the axis of said fixed pivot intersecting the axis of rotation of the work, automatic means to swing said stand about its pivot while the tool is cutting, said tool holder having a cam roll mounted thereon and having spring means to force said tool holder and roll away from the work, and a fixed templet engaged by said roll during said swinging movement and variably controlling the radial position of said tool holder.

EDWIN R. SMITH.